United States Patent [19]
Ahmad

[11] 3,866,652
[45] Feb. 18, 1975

[54] TIRE AND WHEEL COMBINATION

[75] Inventor: Shamim Ahmad, Cuyahoga Falls, Ohio

[73] Assignee: The B. F. Goodrich Company, New York, N.Y.

[22] Filed: May 3, 1974

[21] Appl. No.: 466,736

[52] U.S. Cl. ............. 152/317, 152/310, 152/312
[51] Int. Cl. .................................................. B60c 7/12
[58] Field of Search........... 301/39 R; 152/310, 311, 152/312, 313, 314, 317, 318

[56] References Cited
UNITED STATES PATENTS
2,451,172  10/1948  Nies .................................. 152/310
3,022,810  2/1962  Lambe .............................. 152/310

Primary Examiner—Robert S. Ward, Jr.
Assistant Examiner—D. W. Keen
Attorney, Agent, or Firm—William A. Shira, Jr.

[57] ABSTRACT

A resilient tire and wheel assembly in which a pneumatic type vehicle tire has the cavity between the tire and wheel on which it is mounted filled with a solid, resilient elastomeric composition containing hollow spheres having diameters in the range of 10 to 300 microns.

6 Claims, 3 Drawing Figures

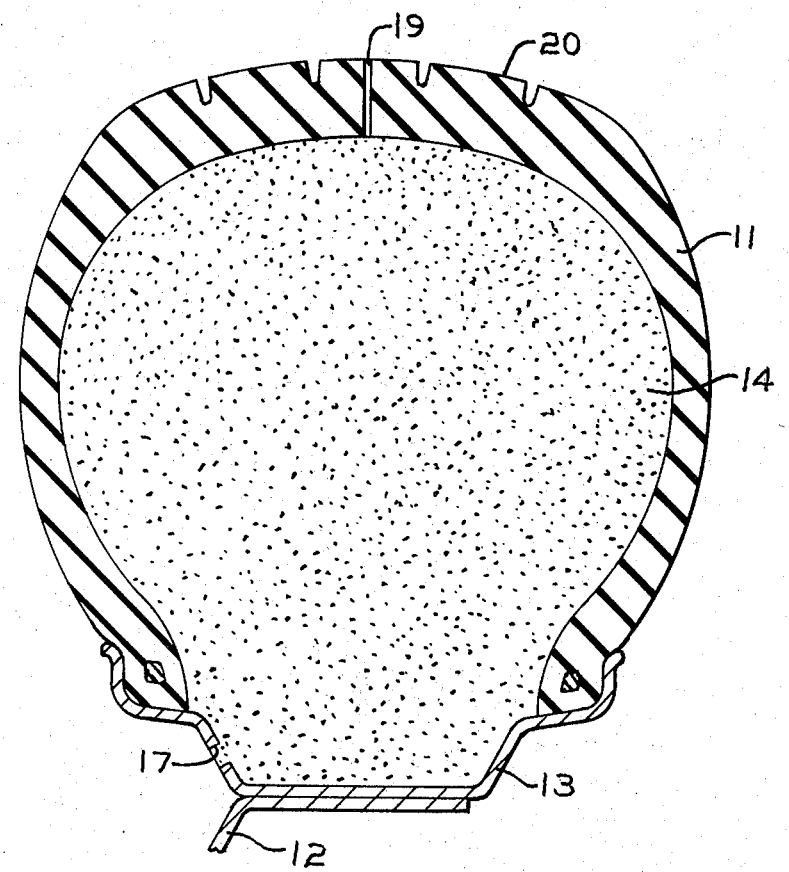
FIG. 1
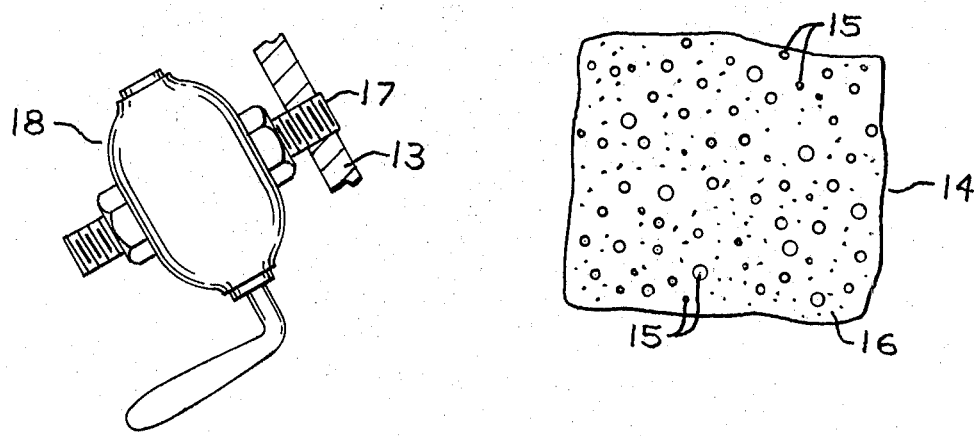
FIG. 3                     FIG. 2

TIRE AND WHEEL COMBINATION

BACKGROUND OF THE INVENTION

Pneumatic tires are used by industry in many environments where severe operating conditions prevail which subject the tire carcass to the possibility of a puncture. When these tires are air-inflated, a puncture causes operating time to be lost while the tire is being repaired.

In order to minimize the down-time caused by a flat tire, various elastomeric compositions have been used to fill tires employed under severe operating conditions. One type of composition is characterized in that it can be pumped into the cavity in a tire-wheel assembly as a liquid and cured therein to a solid, resilient elastomer to form a solid tire. Thus filled, a tire is not only puncture proof but has load-deflection properties approximating that of air filled tires and low hysteresis properties to prevent excessive heat buildup within the tire during service.

Although tires filled in the aforementioned manner can be operated under severe conditions without becoming flat, the weight is increased enormously by the addition of the elastomer. As an example, when an 8.25 × 15 industrial tire mounted on a wheel is filled with a polyurethane having a durometer of about 40 on the Shore A scale, the weight of the assembly is increased by 134 pounds. Such an increase in weight is undesirable because a vehicle equipped with these tires will consume more fuel during operation and will also have reduced braking efficiency. Furthermore, transportation and handling of these filled tire assemblies is rendered more difficult and expensive.

SUMMARY OF THE INVENTION

The previously described undesirable features of prior elastomer filled tires are materially reduced by mixing the elastomer, while in liquid form, with a low specific gravity material consisting of hollow bodies or spheres having diameters ranging from 10 to 300 microns. This liquid mixture is pumped into the cavity of a pneumatic tire and wheel assembly until the pressure rating of the tire carcass is reached. The tire is then cured so that the elastomer becomes a resilient solid containing many discrete air-containing cavities.

Tires filled with this mixture exhibit the same desirable properties as tires filled with the elastomer alone. However, since the specific gravity of the hollow spheres is much lower than that of the elastomer, a substantial weight reduction is realized when a tire is filled with this mixture as compared to a tire filled with the elastomer alone. Hence, vehicles using the tires filled with the elastomer hollow sphere mixture will use less energy and will have increased braking capacity. Moreover, there are important savings in costs of materials as well as in handling and transportation of the tire and wheel assemblies.

BRIEF DESCRIPTION OF THE DRAWINGS

In the accompanying drawings:

FIG. 1 is a radial-cross sectional view through a portion of a pneumatic tire and wheel assembly having the cavity filled with a composition comprising an elastomer and hollow spheres;

FIG. 2 is an enlarged cross sectional view of a portion of the composition illustrated in FIG. 1; and, FIG. 3 is a fragmentary view, partly in section and partly in side elevation, illustrating the valve for controlling filling of the tire.

DETAILED DESCRIPTION

The presently preferred embodiment of the invention comprises an assembly of a pneumatic type tire 11 mounted on a vehicle wheel 12 having a tire mounting rim 13. The cavity formed between the interior of the tire and the rim 13 is filled with a mixture 14 of hollow bodies 15 and a solid, resilient polyurethane substance 16 having a durometer reading of about 40 on the Shore A scale.

For a tubeless type tire and wheel assembly, the invention is preferably practiced by first drilling a hole 17 of suitable size in the rim of the vehicle wheel and tapping the hole to permit attachment of a suitable source of the filling material. A cut-off valve 18 is preferably installed in tire filling line adjacent to the rim to be used as a filling valve when the tire assembly is filled with the elastomer-sphere composition.

The tire-mounting portion of the rim and the interior of the tire should be cleaned to eliminate all dust and moisture after which the tire is mounted on the rim in the usual manner and is inflated through the filling valve 18 to properly seat the bead portions of the tire on the bead seats of the rim. When this is accomplished the tire is placed in an upright position so that the opening 17 is at a maximum height from the ground and the tire is deflated by releasing the air pressure. A hole 19 of suitable size is drilled through the tread 20 and carcass of the mounted tire at a location above the filling opening 17 for the purpose of allowing air to escape during the subsequent filling operation.

For a tube-type tire and wheel assembly no cleaning or rim preparation is necessary. A filling valve, such as 18, is mounted on the tube and the tire is mounted on the wheel and inflated in order to seat its bead portions on the bead seats of the rim. The tube is then deflated and the assembly placed in a vertical position with the valve at a maximum height from the ground. A hole of suitable size is drilled through the top of the tire, but not the tube, at a location above the filling valve. Adjacent to this hole, the top of the casing is penetrated with a large gauge hypodermic needle which does not initially penetrate the tube. During subsequent filling of the tube with the liquid elastomer-hollow sphere mixture, air will first vent from between the tube and casing through the hole in the latter. After all of the air between the tube and casing is vented, the needle will pierce the tube allowing the air in the tube to escape. The rest of the procedure, as hereinafter described, for filling the tube-type tire is the same as for the tubeless type tires.

The liquid portion of the filling material is a polyurethane composition comprising a two-component system which, when the components are combined and cured, makes a solid resilient material having a durometer of about 40 on the Shore A scale. Such a composition may comprise the reaction product of (A) a polypropylene glycol having an average molecular weight in the range of about 1,800 to 2,400 and containing free hydroxyl functionality of about 0.9 to about 1.1 meg./gm. of polypropylene glycol, and (B) a prepolymer of (1) an excess of a mixture of the 2,4 and 2,6 isomers of toluene diisocyanate and (2) said polypropylene glycol with the prepolymer containing free isocyanate functionality of about 0.9 to about 1.1 meg./gm. of prepolymer. A suitable commercially available composition may be purchased under the trademark name of "Tyrfil" from The B.F. Goodrich Company.

To prepare the hollow sphere-polyurethane mixture, the two components of the polyurethane are placed in equal proportions in a mixing pot together with the spheres, and the composition is mixed until a uniform mixture is obtained which is free of air bubbles. The hollow spheres presently used in this invention are free-flowing, thin-walled, hollow glass or ceramic spheres having diameters in the range of approximately 10–300 microns, a true particle density in the range of about 0.200 to 0.350 g/cc. and average wall thickness in the range of 1 to 2 microns.

While there is no lower limit of the amount of spheres which can be used, the advantages of the invention are best achieved when the spheres occupy at least 10% of the volume of the cavity. As an upper bound, the spheres can occupy up to about 25% of the volume of the cavity for all tire filling uses of this composition, and in some cases may consist of up to about 50% of the volume without materially affecting the desirable characteristics of the elastomer.

In the presently preferred embodiment of the invention, the hollow spheres are formed from sodium borosilicate glass. The spheres have a bulk density of about 0.145 g./cc., a true particle density of about 0.237 g./cc. and a particle size range of less than 44 microns to about 175 microns in diameter. More specifically, in terms of percent by weight of the sphers, 6 percent fall in the diameter range of 149–175 microns, 6 percent in the range of 125–149 microns, 13 percent in the range of 100–125 microns, 42 percent in the range of 62–100 microns, 12 percent in the range of 44–62 microns, and 21 percent having diameters of less than 44 microns. These spheres have a packing factor of 0.614 and an average wall thickness of 1.5 microns. While the particular properties and proportions of glass spheres have been given for the presently preferred embodiment of the invention, many other combinations of sizes and compositions of hollow spheres can also be used, and the invention is not limited to the use of any particular type.

Once mixed, the combination of the two urethane components and the hollow glass spheres has about a three hour pot life before it starts to gel. The filling of a tire with the mixture can be accomplished with known equipment. Thus, either a pressure pot or a positive displacement pump may be employed. In either case, a suitable hose or other conduit is connected from the material supply to the cut-off valve 18 for the tire-rim assembly.

The composition is supplied to the tire under pressure and when it begins to leak out of the vent opening 17 in the top of the tire, the filling valve 18 should be closed at that moment and the venting hole 19 should be plugged. This plugging can be simply and effectively achieved by screwing a sheet metal screw of appropriate dimensions into the vent opening. The valve 18 is then reopened and filling the tire with the composition continued until the rated pneumatic pressure for the tire is reached. When this occurs, the filling valve 18 is again closed and the composition supply line is removed, but the filling valve 18 is left in place until the composition has cured.

The filled tire is cured by laying the assembly in a horizontal position in an oven and subjecting it to a temperature of 120°F. – 160°F. for a period of 24 hours to 10 hours depending upon the size of the tire. After cure is complete, the filling valve is removed and is replaced with a suitable plug.

The use of this mixture can result in a substantial weight reduction per filled tire. As an example, if an 8.25 × 15 industrial tire is filled with the polyurethane alone, 134 pounds is added to the weight of the tire. On the other hand, a mixture of glass spheres having an average specific gravity of 0.237 g./cc. and the polyurethane adds only 86 pounds per tire when the materials are used in a ratio of 15 pounds glass spheres to 71 pounds of polyurethane.

Although certain specific compositions, size distributions, weight ratios and other physical properties of the hollow spheres have been given by way of example, the invention is not so limited. Nor is it limited as disclosed by way of example, to any particular resilient elastomeric material used in combination with the spheres. The only limitation on the use of any combination of hollow spheres and tire filling elastomer is that the use of the spheres should not destroy the characteristics of the elastomer filled tire assembly which are essential to the operation of the tire. Hence, modifications may be made from the specifically described embodiment without exceeding the ambit of the invention the scope of which is defined in the appended claims.

I claim:
1. An assembly comprising:
    a. pneumatic tire;
    b. a vehicle wheel having a tire-mounting rim with said tire mounted on said rim forming a cavity between the interior of the tire and rim; and,
    c. said cavity filled with a solid, resilient composition comprising a mixture of:
        1. an elastomeric material;
        2. hollow spheres having diameters ranging from 10 to 300 microns, with said spheres dispersed throughout the elastomeric material and the elastomer cured, thereby forming a solid filling of said cavity.
2. The assembly in claim 1 wherein the elastomer consists essentially of a two-component polyurethane system which, when said components are combined and cured, makes a resilient solid material having a durometer of about 40 on the Shore A scale.
3. The assembly in claim 2 wherein the hollow spheres are made of glass having a true partial density in the range of 0.200 to 0.350 g./cc. and particle diameters ranging from 10 to 300 microns, with an average wall thickness in the range of 1 to 2 microns.
4. The assembly in claim 1 wherein the hollow spheres are made of ceramic materials.
5. The assembly in claim 1 wherein the hollow spheres occupy from about 10 to 25 percent of the volume of the cavity.
6. The assembly in claim 1 wherein the hollow spheres occupy from about 10 to about 50 percent of the volume of the cavity.

* * * * *